(12) United States Patent
Feigel et al.

(10) Patent No.: US 7,090,358 B2
(45) Date of Patent: Aug. 15, 2006

(54) SYSTEM, APPARATUS AND METHOD OF DISPLAYING INFORMATION FOR FOVEAL VISION AND PERIPHERAL VISION

(75) Inventors: Roy Feigel, Austin, TX (US); Rick Kjeldsen, Poughkeepsie, NY (US); Bruce Mahaffey, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 10/793,459

(22) Filed: Mar. 4, 2004

(65) Prior Publication Data

US 2005/0195373 A1    Sep. 8, 2005

(51) Int. Cl.
G03B 21/26 (2006.01)
H04N 7/18 (2006.01)
G06K 9/46 (2006.01)
G06F 3/00 (2006.01)
G06F 9/00 (2006.01)
G06F 17/00 (2006.01)

(52) U.S. Cl. ............... 353/94; 353/28; 353/69; 353/30; 353/46; 348/77; 382/236; 382/276; 715/863; 719/328

(58) Field of Classification Search ............ 353/28, 353/69, 30, 46, 94; 340/691.6; 348/77; 382/236, 276; 715/863; 719/328; 704/275
See application file for complete search history.

(56) References Cited

U.S. PATENT DOCUMENTS 5,774,591 A * 6/1998 Black et al. ............ 382/236

| | | | |
|---|---|---|---|
| 6,431,711 B1 * | 8/2002 | Pinhanez ............ | 353/69 |
| 6,731,307 B1 * | 5/2004 | Strubbe et al. ............ | 715/727 |
| 6,890,077 B1 * | 5/2005 | Dunn ............ | 351/224 |
| 2002/0135618 A1 * | 9/2002 | Maes et al. ............ | 345/767 |

FOREIGN PATENT DOCUMENTS

EP    1107052 A1 *    6/2001

OTHER PUBLICATIONS

*Steerable Interfaces For Pervasive Computing Spaces*, by Pingali et al., IBM T.J. Watson Research Center, Mar. 2003.
*Embedding Interactions in a Retail Store Environment: The Design and Lessons Learned*, by Sukaviriya et al., IBM T.J. Watson Research Center.
*Transforming Surfaces into Touch-Screens* by Pinhanez et al., IBM T.J. Watson Research Center, Dec. 2001.
*Dynamically Reconfigurable Vision-Based User Interfaces* by Kjeldsen et al., IBM T.J. Watson Research Center.
*Interacting With Steerable Projected Displays* by Kjeldsen et al., IBM T.J. Watson Research Center, May 2002.

* cited by examiner

*Primary Examiner*—W. B. Perkey
*Assistant Examiner*—Magda Cruz
(74) *Attorney, Agent, or Firm*—Volel Emile; Casimer K. Salys; Robert M. Carwell

(57) ABSTRACT

A system, apparatus and method of displaying information for foveal vision and peripheral vision are provided. The system, apparatus and method generate a composite display image fully viewable with foveal vision and peripheral vision. The system, apparatus and method detect, either through gesture or speech recognition, an area on the composite display image a user is focusing on with foveal vision and display the area in a resolution higher than the resolution in which the rest of the composite display image is displayed.

20 Claims, 7 Drawing Sheets

SYSTEM, APPARATUS AND METHOD OF DISPLAYING INFORMATION FOR FOVEAL VISION AND PERIPHERAL VISION

BACKGROUND OF THE INVENTION

1. Technical Field

The present invention is directed to information display. More specifically, the present invention is directed to a system, apparatus and method of displaying information for foveal vision and peripheral vision.

2. Description of Related Art

In live group meetings, background information may be placed on walls of a conference room to allow participants to scan the information as needed. After a participant has scanned a piece of background information, however, the participant's focus is ordinarily returned to information relating to a topic in discussion. When a participant's focus is directed to a particular piece of information, that piece of information may be said to be in the participant's foveal vision. All other pieces of information may then be said to be in the participant's peripheral vision.

Foveal vision is high resolution or acuity vision whereas peripheral vision is wide field of vision. Unlike foveal vision, peripheral vision is not of high resolution but nonetheless provides situation awareness and/or information detection. Put in another way, foveal vision may be likened to a magnifier whereas peripheral vision to data compression. It (peripheral vision) allows a biological computer (e.g., a human being), which includes a foveal system and a peripheral system, to determine where to find relevant information. From this, the biological computer calculates in milliseconds all necessary muscle commands for bringing the foveal system into position. This may happen three to four times per second, each time, the compressed data of the peripheral system is automatically recalculated to compensate for eye movements. Thus, using peripheral vision a participant may quickly determine which of the different pieces of information that are placed on the wall of the conference room to focus on when needed.

In e-meetings, information is displayed on a computer display screen. Participants, therefore, are constrained to only one piece of information at a time. Consequently, to consult a piece of background information that is not being presently displayed, a search may have to be undertaken on the computer system to find and bring forth the information. This may consume time detracting the participant from the topic in discussion.

Hence, what is needed is a system, apparatus and method of displaying information in an e-meeting for foveal vision and peripheral vision.

SUMMARY OF THE INVENTION

The present invention provides a system, apparatus and method of displaying information for foveal vision and peripheral vision. The system, apparatus and method generate a composite display image fully viewable with foveal vision and peripheral vision. The system, apparatus and method detect, either through gesture or speech recognition, an area on the composite display image a user is focusing on with foveal vision and display the area in a resolution higher than the resolution in which the rest of the composite display image is displayed. The composite display image may be generated by multiple computer systems. Particularly, one computer system may be used to generate the area of the composite display image in the higher resolution while another computer system may be used to generate the rest of the composite image display in the lower resolution.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is implemented using Everywhere Display (ED) technology. ED is a product of International Business Machines (IBM) Corp. and allows every surface in a space to be transformed into a projected "touch screen" display. Particularly, ED projects an image onto a surface and uses gesture recognition to determine where on the image a user is pointing. ED is disclosed in a variety of references of which the most applicable ones follow: STEERABLE INTERFACES FOR PERVASIVE COMPUTING SPACES by Pingali et al., IBM T.J. Watson Research Center, March 2003; EMBEDDING INTERACTIONS IN A RETAIL STORE ENVIRONMENT: THE DESIGN AND LESSONS LEARNED by Sukaviriya et al., IBM T.J. Watson Research Center; TRANSFORMING SURFACES INTO TOUCH-SCREENS by Pinhanez et al., IBM T.J. Watson Research Center, December 2001; DYNAMICALLY RECONFIGURABLE VISION-BASED USER INTERFACES by Kjeldsen et al., IBM T.J. Watson Research Center; and INTERACTING WITH STEERABLE PROJECTED DISPLAYS by Kjeldsen et al., IBM T.J. Watson Research Center, May 2002. The references are provided in an Information Disclosure Statement filed concurrently with the present invention. The disclosure of each one of the references is herein incorporated by reference.

Figure 1:
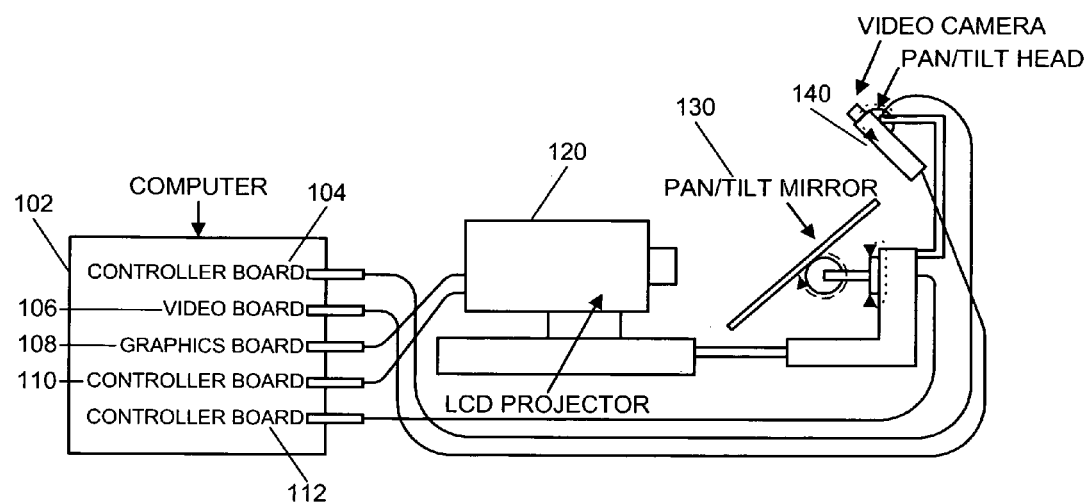
FIG. 1 depicts an exemplary Everywhere Display system.

FIG. 1 depicts an exemplary ED system. The system includes a computer 102, a liquid crystal display (LCD) projector 120, a pan/tilt mirror 130 and a video camera with a pan/tilt head 140. The computer 102 has a first controller board (controller board$_1$ 104) to control the pan/tilt head of the video camera 140, a second controller board (controller board$_2$ 110) to control the LCD projector 120 and a third controller board (controller board$_3$ 112) to control the pan/tilt mirror 130. The computer 102 further contains a video capture board 106 connected to the video camera 140 and a graphics board 108 connected to the LCD projector 120.

The pan/tilt mirror 130 is used to deflect images from the LCD projector 120 to surfaces (e.g., walls, floor, etc.) of a room. The projected image may be processed to compensate for perspective distortions. The pan/tilt video camera 140 is used to detect hand/body activity on the projected area. This allows a user to interact with the system by simply touching the projected image.

As stated in the references, ED obviates the need to wire surfaces to use with sensing devices, use monitors or other sensing devices as well as to have users wear graphics goggles or special input devices. Further the ED projector can be easily steered to a new surface by a simple software command, thus avoiding fixed setups where projectors or cameras can only perform one specific task. The pan/tilt mechanisms provide dynamic adaptation to changes in the surface being used and to different patterns of user activity.

Figure 2:
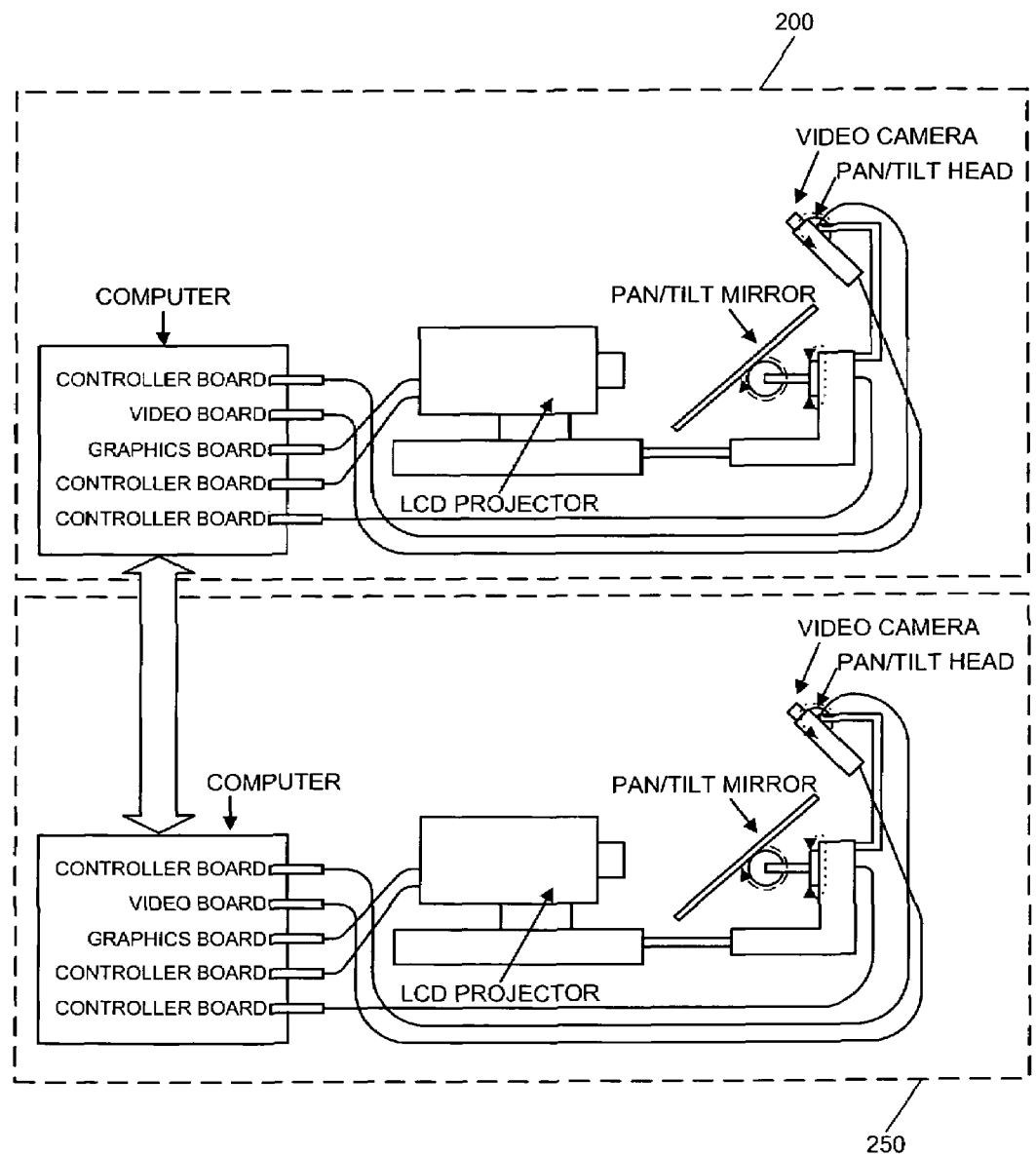
FIG. 2 depicts two interconnected Everywhere Display systems that may be used by the present invention.

The present invention uses two interconnected ED systems as shown in FIG. 2. One ED system (e.g., system 200) may be placed above or behind a user to project one high resolution image on a surface directly in front of the user and within easy gesture reach. The other ED system (e.g., system 250) may be placed at a location to project a composite of multiple images in moderate resolution on surfaces near the user. The projected image from ED system 200 may be used to provide information about the topic in discussion and the images from ED system 250 may provide background information. Thus, ED system 200 may project an image that may be likened to foveal vision and ED system 250 may project images akin to peripheral vision. Consequently, the two interconnected ED systems will provide images comparable to a wall of charts that is visible by both foveal and peripheral visions.

Figure 3:
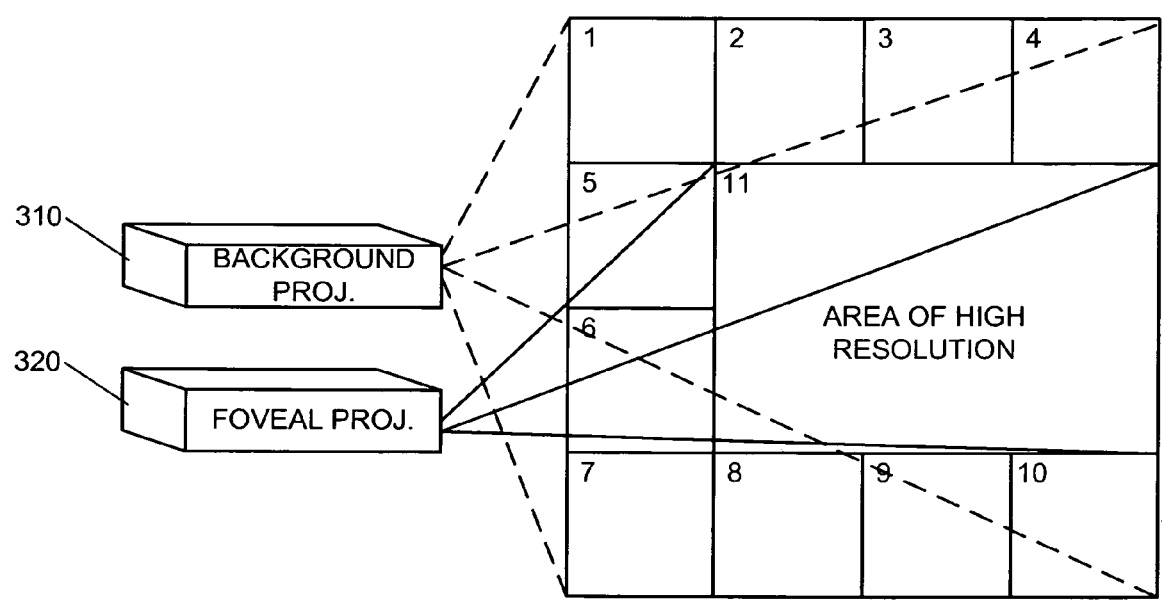
FIG. 3 depicts an exemplary wall of charts display using the present invention.

FIG. 3 depicts an exemplary wall of charts display using the present invention. Each area (i.e., areas 1–10) in the wall of charts may display background information in moderate resolution for peripheral vision whereas area 11 may display information in high resolution for forveal vision. Thus, areas 1–10 may be displayed using background (or peripheral) projector 310 (i.e., the projector of system 250) and area 11 may be displayed using forveal projector 320 (i.e., the projector of system 200).

When the user desires to have a closer inspection of one of the background images (i.e., one of the images from system 250), the user may select the image using gesture recognition or speech recognition. When that occurs, an exchange of images will occur. That is, the selected background image will then be projected by system 200 in high resolution in area 11 and the original image from system 200 will be displayed by system 250 in moderate resolution in the area where the background image was displayed. Thus, any image displayed by system 250 in moderate resolution may be displayed by system 200 in high resolution when selected as mentioned above. Note that to select an image by speech recognition, the user may have to indicate the position of the image (e.g., third image from the left, right, top, bottom etc.) or its title.

Any one or all the images being projected by either or both systems 200 and 250 may come from a remote location. Particularly, since e-meetings involve participants who are geographically separated from each other, any number of the images may be from a remote participant or participants. Further, the images may be from a remote ED system or a remote video-conferencing system. In addition, any image that is being displayed in high resolution by a remote ED system or a remote video-conferencing system may be displayed by a local ED system of the present invention.

Figure 4:
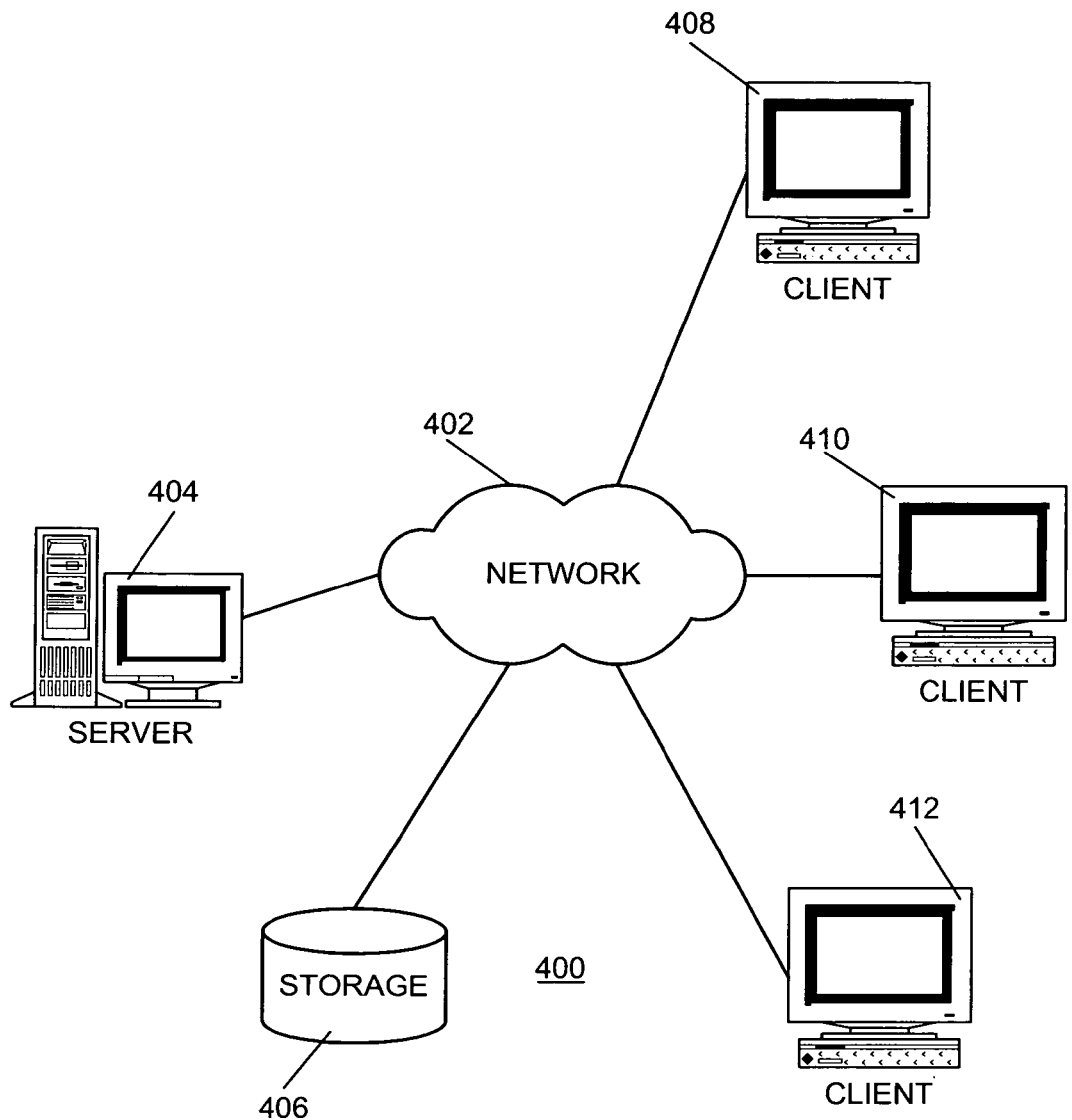
FIG. 4 is an exemplary block diagram illustrating a distributed data processing system according to the present invention.

FIG. 4 depicts a pictorial representation of a network of data processing systems that may be used to provide the images to the present invention. Network data processing system 400 contains a network 402, which is the medium used to provide communications links between various devices and computers connected together within network data processing system 400. Network 402 may include connections, such as wire, wireless communication links, or fiber optic cables.

In the depicted example, server 404 is connected to network 402 along with storage unit 406. In addition, clients 408, 410, and 412 are connected to network 402. These clients 408, 410, and 412 may be, for example, personal computers or network computers. In the depicted example, server 404 provides data, such as boot files, operating system images, and applications to clients 408, 410 and 412. Clients 408, 410 and 412 are clients to server 404. Network data processing system 400 may include additional servers, clients, and other devices not shown. In the depicted example, network data processing system 400 is the Internet with network 402 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 400 also may be implemented as a number of different types of networks, such as for example, an intranet, a local area network (LAN), or a wide area network (WAN). FIG. 4 is intended as an example, and not as an architectural limitation for the present invention.

Figure 5:
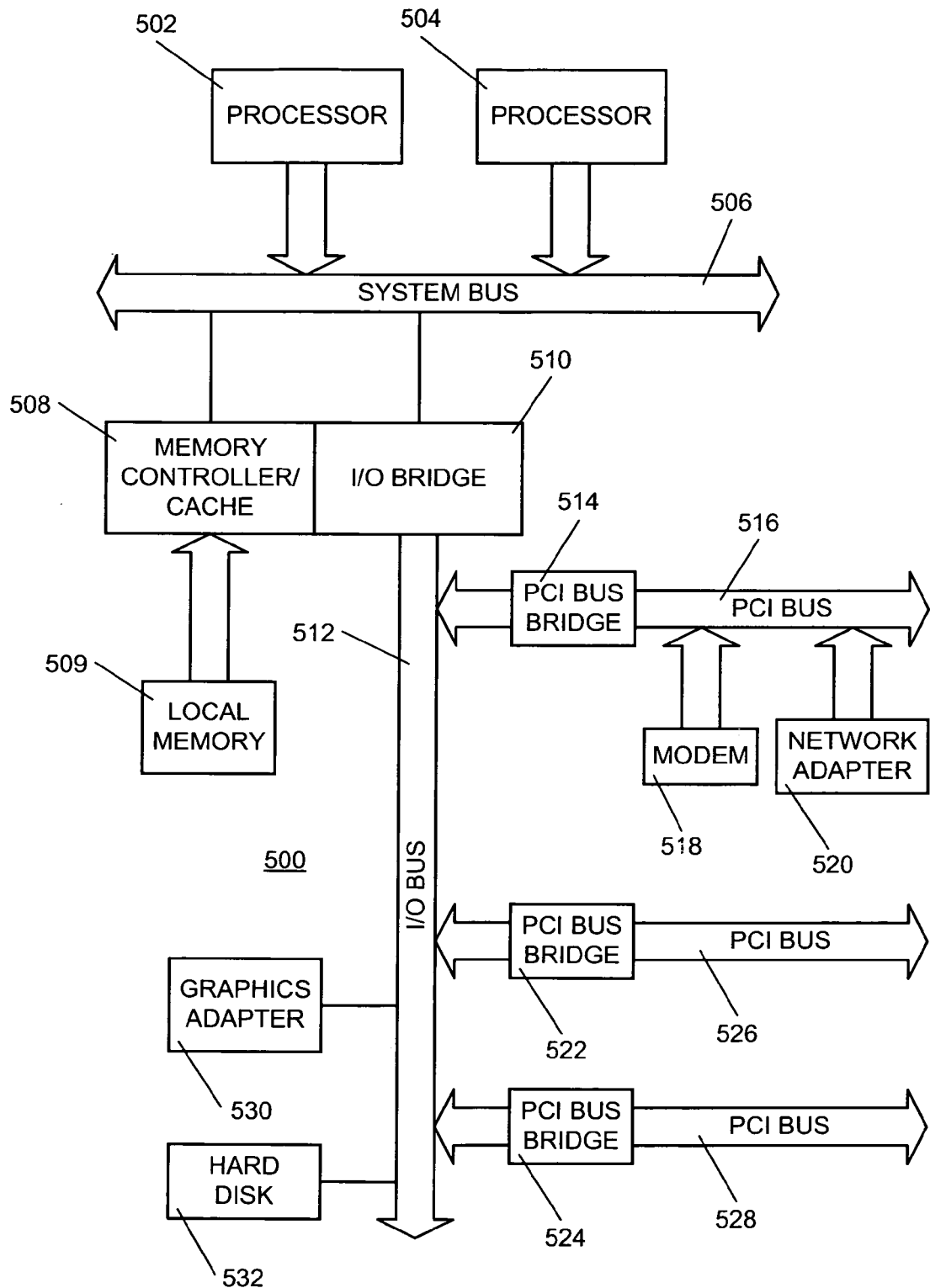
FIG. 5 is an exemplary block diagram of a server apparatus according to the present invention.

Referring to FIG. 5, a block diagram of a data processing system that may be implemented as a server, such as server 404 in FIG. 4, is depicted in accordance with a preferred embodiment of the present invention. Data processing system 500 may be a symmetric multiprocessor (SMP) system including a plurality of processors 502 and 504 connected to system bus 506. Alternatively, a single processor system may be employed. Also connected to system bus 506 is memory controller/cache 508, which provides an interface to local memory 509. I/O bus bridge 510 is connected to system bus 506 and provides an interface to I/O bus 512. Memory controller/cache 508 and I/O bus bridge 510 may be integrated as depicted.

Peripheral component interconnect (PCI) bus bridge 514 connected to I/O bus 512 provides an interface to PCI local bus 516. A number of modems may be connected to PCI local bus 516. Typical PCI bus implementations will support four PCI expansion slots or add-in connectors. Communications links to network computers 408, 410 and 412 in FIG. 4 may be provided through modem 518 and network adapter 520 connected to PCI local bus 516 through add-in boards.

Additional PCI bus bridges 522 and 524 provide interfaces for additional PCI local buses 526 and 528, from which additional modems or network adapters may be supported. In this manner, data processing system 500 allows connections to multiple network computers. A memory-mapped graphics adapter 530 and hard disk 532 may also be connected to I/O bus 512 as depicted, either directly or indirectly.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 5 may be, for example, an IBM e-Server pSeries system, a product of International Business Machines Corporation in Armonk, N.Y., running the Advanced Interactive Executive (AIX) operating system or LINUX operating system.

Figure 6:
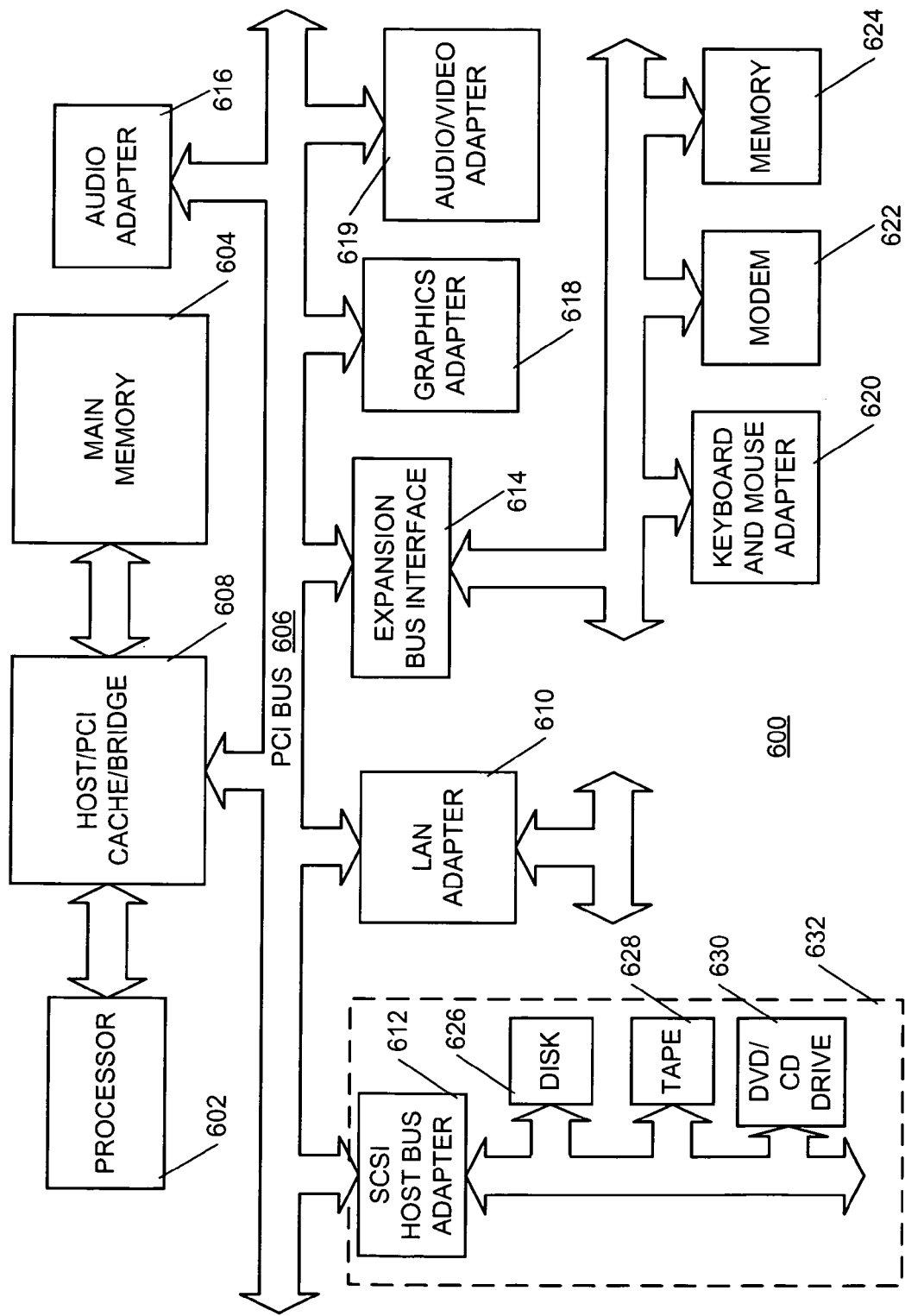
FIG. 6 is an exemplary block diagram of a client apparatus according to the present invention.

With reference now to FIG. 6, a block diagram illustrating a data processing system is depicted in which the present invention may be implemented. Data processing system 600 is an example of a client computer. Data processing system 600 employs a peripheral component interconnect (PCI) local bus architecture. Although the depicted example employs a PCI bus, other bus architectures such as Accelerated Graphics Port (AGP) and Industry Standard Architecture (ISA) may be used. Processor 602 and main memory 604 are connected to PCI local bus 606 through PCI bridge 608. PCI bridge 608 also may include an integrated memory controller and cache memory for processor 602. Additional connections to PCI local bus 606 may be made through direct component interconnection or through add-in boards. In the depicted example, local area network (LAN) adapter 610, SCSI host bus adapter 612, and expansion bus interface 614 are connected to PCI local bus 606 by direct component connection. In contrast, audio adapter 616, graphics adapter 618, and audio/video adapter 619 are connected to PCI local bus 606 by add-in boards inserted into expansion slots. Expansion bus interface 614 provides a connection for a keyboard and mouse adapter 620, modem 622, and additional memory 624. Small computer system interface (SCSI) host bus adapter 612 provides a connection for hard disk drive 626, tape drive 628, and CD-ROM/DVD drive 630. Typical PCI local bus implementations will support three or four PCI expansion slots or add-in connectors.

An operating system runs on processor 602 and is used to coordinate and provide control of various components within data processing system 600 in FIG. 6. The operating system may be a commercially available operating system, such as Windows XP™, which is available from Microsoft Corporation. An object oriented programming system such as Java may run in conjunction with the operating system and provide calls to the operating system from Java programs or applications executing on data processing system 600. "Java" is a trademark of Sun Microsystems, Inc. Instructions for the operating system, the object-oriented operating system, and applications or programs are located on storage devices, such as hard disk drive 626, and may be loaded into main memory 604 for execution by processor 602.

Those of ordinary skill in the art will appreciate that the hardware in FIG. 6 may vary depending on the implementation. Other internal hardware or peripheral devices, such as flash ROM (or equivalent nonvolatile memory) or optical disk drives and the like, may be used in addition to or in place of the hardware depicted in FIG. 6. Also, the processes of the present invention may be applied to a multiprocessor data processing system.

As another example, data processing system 600 may be a stand-alone system configured to be bootable without relying on some type of network communication interface, whether or not data processing system 600 comprises some type of network communication interface. As a further example, data processing system 600 may be a Personal Digital Assistant (PDA) device, which is configured with ROM and/or flash ROM in order to provide non-volatile memory for storing operating system files and/or user-generated data.

The depicted example in FIG. 6 and above-described examples are not meant to imply architectural limitations. For example, data processing system 600 may also be a notebook computer or hand held computer in addition to taking the form of a PDA. Data processing system 600 also may be a kiosk or a Web appliance.

In any case, any one of clients 408, 410 and 412 may represent the ED system of FIG. 2 and the present invention may reside on any data storage medium (i.e., floppy disk, compact disk, hard disk, ROM, RAM, etc.) used by a computer system.

Figure 7:
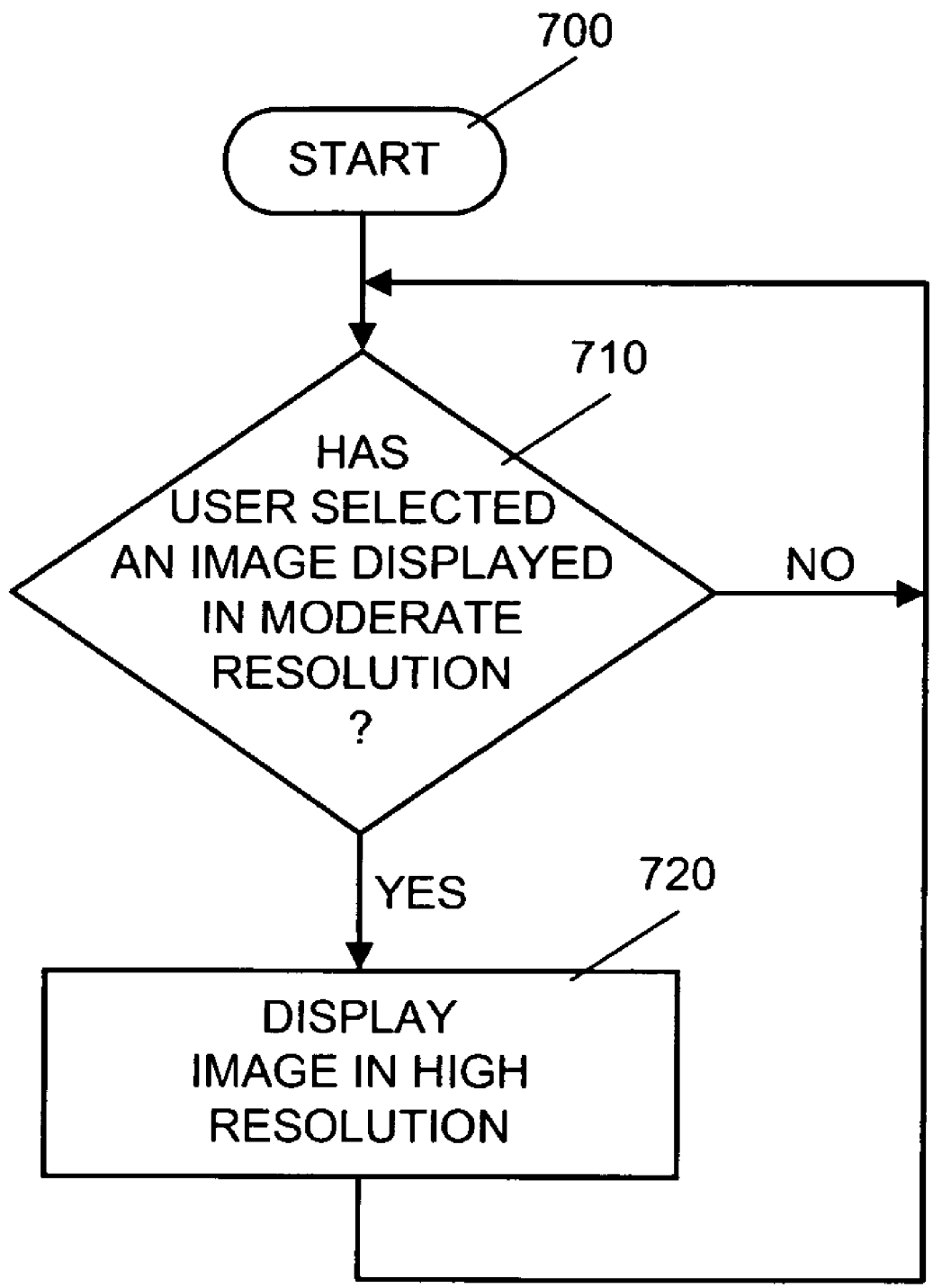
FIG. 7 a flowchart of a process that may be used by the present invention.

FIG. 7 depicts a flowchart of a process that may be used by the present invention. The process starts when a user instantiates the ED system of FIG. 2 (step 700). Then a check is continuously being made to determine whether the user has selected a moderately displayed image. If so, the image is displayed in high resolution. Note that this may occur by having the image displayed by system 200 or by having the image be displayed by system 250 in high resolution (steps 710 and 712). The process ends when the user terminates the session.

The description of the present invention has been presented for purposes of illustration and description, and is not intended to be exhaustive or limited to the invention in the form disclosed. For example, only one ED system may be used. In that case, when the user selects a background image for inspection, the ED system may display the image at a higher resolution. Thus, many modifications and variations will be apparent to those of ordinary skill in the art. Thus, the embodiment was chosen and described in order to best explain the principles of the invention, the practical application, and to enable others of ordinary skill in the art to understand the invention for various embodiments with various modifications as are suited to the particular use contemplated.

What is claimed is:

1. A method of displaying information for foveal vision and peripheral vision comprising the steps of:
   obtaining a plurality of images;
   generating a composite display image fully viewable with said foveal vision and said peripheral vision using said plurality of images;
   detecting, using gesture recognition, one of the images of said composite display image a user is focusing on with said foveal vision, said image having a first resolution; and
   generating, in said composite display image, said image in a second resolution greater than said first resolution.

2. The method of claim 1 wherein the composite display image is generated by multiple systems, one system for generating said image having said second resolution and another system for generating the composite image in said first resolution.

3. The method of claim 2 wherein said composite display image is from a plurality of video sources.

4. The method of claim 1 wherein said step of detecting including the step of detecting said image using speech recognition.

5. The method of claim 4 wherein the composite display image is generated by multiple systems, one system for generating said image having said second resolution and another system for generating the composite image in said first resolution.

6. The method of claim 5 wherein said composite display image is from a plurality of video sources.

7. A computer program product on a computer readable medium for displaying information for foveal vision and peripheral vision comprising:
   code means for obtaining a plurality of images;

code means for generating a composite display image fully viewable with said foveal vision and said peripheral vision using said plurality of images;

code means for detecting, using gesture recognition, one of the images of said composite display image a user is focusing on with said foveal vision, said image having a first resolution; and code means for generating, in said composite display image, said image in a second resolution greater than said first resolution.

8. The computer program product of claim 7 wherein the composite display image is generated by multiple systems, one system for generating said image having said second resolution and another system for generating the composite image in said first resolution.

9. The computer program product of claim 8 wherein said composite display image is from a plurality of video sources.

10. The computer program product of claim 7 wherein said detecting code means includes code means for detecting said image using speech recognition.

11. The computer program product of claim 10 wherein the composite display image is generated by multiple systems, one system for generating said image having said second resolution and another system for generating the composite image in said first resolution.

12. The computer program product of claim 11 wherein said composite display image is from a plurality of video sources.

13. An apparatus for displaying information for foveal vision and peripheral vision comprising:

means for obtaining a plurality of images;

code means for generating a composite display image fully viewable with said foveal vision and said peripheral vision using said plurality of images;

means for detecting, using gesture recognition, one of the images of said composite display image a user is focusing on with said foveal vision, said image having a first resolution; and means for generating, in said composite display image, said image in a second resolution greater than said first resolution.

14. The apparatus of claim 13 wherein the composite display image is generated by multiple generating means, one generating means for generating said image having said second resolution and another for generating the composite image in said first resolution.

15. The apparatus of claim 14 wherein said composite display image is from a plurality of video sources.

16. The apparatus of claim 13 wherein said detecting means includes means for detecting said image using speech recognition.

17. The apparatus of claim 16 wherein the composite display image is generated by multiple systems, one system for generating said image having said second resolution and another system for generating the composite image in said first resolution.

18. The apparatus of claim 17 wherein said composite display image is from a plurality of video sources.

19. A system for displaying information for foveal vision and peripheral vision comprising:

at least one storage system for storing code data; and at least one processor for processing the code data to obtain a plurality of images, to generate a composite display image fully viewable with said foveal vision and said peripheral vision using said plurality of images, to detect, using gesture recognition, one of the images of said composite display image a user is focusing on with said foveal vision, said image having a first resolution, and to generate, in said composite display image, said image in a second resolution greater than said first resolution.

20. The system of claim 19 wherein the code data is processed to detect said image using speech recognition.

* * * * *